United States Patent [19]

Matsushita et al.

[11] 4,377,947

[45] Mar. 29, 1983

[54] DEVICE FOR IDENTIFYING RUBBING LOCATIONS IN ROTATING MACHINES

[75] Inventors: Osami Matsushita, Tomobemachi; Motohiro Satoh, Minorimachi; Susumu Hioki, Kashiwa; Katsuaki Kikuchi, Tsuchiura; Shigeru Izumi, Tokyo, all of Japan

[73] Assignee: Hitachi, Ltd., Tokyo, Japan

[21] Appl. No.: 206,643

[22] Filed: Nov. 13, 1980

[30] Foreign Application Priority Data

Nov. 16, 1979 [JP] Japan ................... 54-147692

[51] Int. Cl.³ ........................................... G01N 29/04
[52] U.S. Cl. ........................................ 73/593; 73/660
[58] Field of Search ............................. 73/593, 660

[56] References Cited

U.S. PATENT DOCUMENTS 4,196,629  4/1980  Philips ........................ 73/593
4,262,538  4/1981  Otawara ....................... 73/593

*Primary Examiner*—Anthony V. Ciarlante
*Attorney, Agent, or Firm*—Antonelli, Terry & Wands

[57] ABSTRACT

A device for identifying an acoustic sound producing location in an axial direction of a rotating body by using an acoustic signal and a rotational pulse signal. In the device, a rubbing location identifying signal is provided in synchronism with the rotational pulse signal in which the pulse interval corresponds to the distance between acoustic sensors or a rotor length. A phase of a peak in a rubbing location identifying signal as measured with respect to the pulse represents an acutal rubbing location.

5 Claims, 17 Drawing Figures

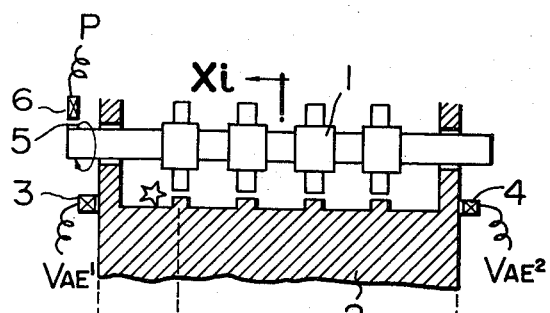
FIG. 1A
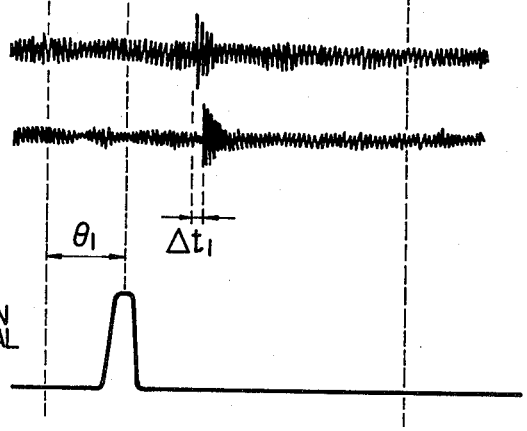
FIG. 1B
ROTATIONAL PULSE SIGNAL P
FIG. 1C
ACOUSTIC SIGNAL
$V_{AE^1}$
$V_{AE^2}$
FIG. 1D
RUBBING LOCATION IDENTIFYING SIGNAL
$\bar{Z}$

ROTATIONAL PULSE SIGNAL
P

ACOUSTIC SIGNAL
$V_{AE}{}^1$ $V_{AE}{}^2$ $\Delta t_1$  $\Delta t_2$

RUBBING LOCATION IDENTIFYING SIGNAL
$\overline{Z}$

ROTATIONAL
PULSE SIGNAL
P

ACOUSTIC SIGNAL
$V_{AE}{}^1$ $V_{AE}{}^2$

RUBBING LOCATION
IDENTIFYING SIGNAL
$\bar{Z}$

ROTATIONAL PULSE SIGNALS
FROM AGAP SENSOR
P'

ROTATIONAL PULSE SIGNALS
AFTER WORKED
P

DEVICE FOR IDENTIFYING RUBBING LOCATIONS IN ROTATING MACHINES

The invention relates to a device for identifying a rubbing location in a rotating machine by using an acoustic signal produced in synchronism with the rotation of a rotating machine, such as turbines and pumps.

The term "rubbing" refers to a phenomenon in which a rotating body, such as a rotor, comes in contact with a stationary body, such as a casing, for some reason, both of which are not in contact with each other in a normal condition. The rubbing phenomenon generally occurs when a remarkable unbalance occurs in the rotor. That is, such an unbalance causes a large rotor vibration beyond the normal clearances of the respective parts at a high speed. It is known that when such rubbing phenomenon occurs, an acoustic signal is produced having a frequency of several MHz for example, that is an acoustic emission is produced.

Such rubbing phenomenon frequently causes serious damage in the rotating machine. To avoid such damage, it is necessary to quickly detect the occurence of the rubbing phenomenon by using the acoustic signal and to take some countermeasure against such phenomenon. One of the devices to detect the rubbing phenomenon has been proposed in Japanese Laid-Open Patent Application No. 147882/79 filed by the same applicant as the present application.

The rubbing location identifying device of the above Patent Application uses a rotational pulse sensor and acoustic sensors axially disposed at respective ends of the rotating machine in the axial direction and determines an acoustic sound producing location in the axial direction on the basis of a difference between travelling times of the acoustic signals arriving at the respective acoustic sensors. The rotational pulse corresponds to one rotation of the rotor. The rubbing phenomenon particularly takes place one time for one or two rotations in synchronism with the rotation of the rotor. The acoustic signals from both the acoustic sensors seem substantially to be in synchronism with the rotational pulse signal.

When the rubbing occurs between the rotor and the casing, the acoustic signal produced therefrom arrives at the respective acoustic sensors with a slight travelling time difference $\Delta t_i$. By detecting the travelling time difference $\Delta t_i$, an acoustic sound producing source, i.e. a location $X_i$ where the rotating body comes in contact with the stationary body, is determined by the following equation $$X_i = \Delta t_i \cdot V/2 \qquad (1)$$

where V is the propagating speed of the acoustic signal, and $X_i$ is an axial distance measured from the center to the contact location, or the rubbing location.

As seen from the equation, the contact location identifying signal produced from the device is proportional to the travelling time difference $\Delta t_i$.

The contact location identifying signal X frequently suffers from measuring errors and its value greatly changes. An average signal $\overline{X}$, which is given by averaging the signals X with respect to time, hardly suffers from the measuring error and its value becomes constant. Therefore, it is preferable to use the average signal $\overline{X}$ for identifying the rubbing location.

However, the device to analyze the rubbing phenomenon has the following shortcomings:

(i) The signal $\overline{X}$ is actually expressed in terms of voltage. Because of this, it is necessary to convert the voltage value into the corresponding distance on the actual rotor. Therefore, it is difficult to quickly estimate the distance to the actual contact location by seeing the waveform of the signal $\overline{X}$. Thus, this device is not proper for a monitor.

(ii) Since the signal $\overline{X}$ is averaged with respect to time, if the rotor and the casing are in contact with each other at two axial locations, the produced voltage value corresponds to an intermediate distance between distances to both the contact locations. Therefore, the device is totally ineffective for identifying the rubbing locations in such a case where the rotor and the casing contact with each other at a plurality of locations.

Accordingly, an object of the present invention is to provide a rubbing location identifying device which can quickly detect a rubbing location by using an acoustic signal produced in synchronism with the rotation of a rotating machine, and can be suitably used as a monitor.

Another object of the present invention is to provide a rubbing location identifying device capable of accurately determining rubbing locations when the rubbing takes place at a plurality of locations.

To achieve the above objects, there is provided a rubbing location identifying device having at least two acoustic sensors each for sensing a rubbing sound produced when a rotating body comes into contact with a stationary body, and a rotational pulse generating means for generating rotational pulses one for each rotation of the rotational body, and a circuit for identifying an acoustic sound producing location in an axial direction of a rotating machine on the basis of the travelling time difference of the acoustic signals arriving at said acoustic sensors; further comprising a memory having a plurality of storage locations corresponding to a respective incremental distance from a reference point on the rotating body, and a D/A converter for D/A converting the memory content representative of a histogram of the acoustic signal locations, whereby an identifying signal of the rubbing location in the axial direction is obtained in synchronism with the rotational pulse signal, and thus the phase of a peak of a rubbing location identifying signal as measured with respect to the pulse signal is adapted to represent an actual rubbing location.

These and other objects, features and advantages of the present invention will be apparent from the following descriptions taken in conjunction with the accompanying drawings, in which:

FIG. 1A shows a schematic diagram of an embodiment of a rubbing location identifying device for a rotating machine according to the present invention and FIGS. 1B-1D show a set of waveforms obtained by the rubbing location identifying device;

Figure 5A:
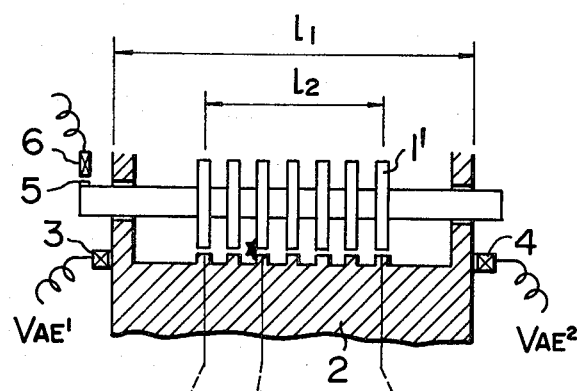
Figure 5B:
Figure 5C:
Figure 5C:
Figure 5D:
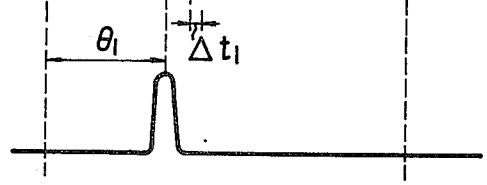
Figure 6A:
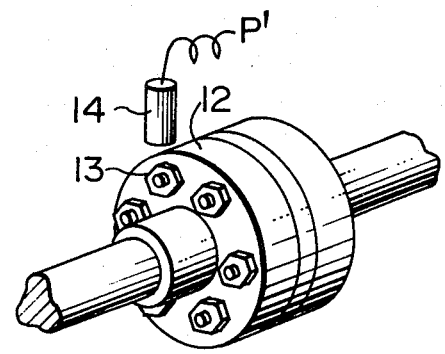
Figure 6B:
Figure 6C:

FIG. 5A shows a schematic diagram of another embodiment of the rubbing location identifying device for a rotating machine according to the present invention and FIGS. 5B–5D show waveforms provided by the identifying device; and FIG. 6A shows a schematic diagram of a pulse signal generating device used in the embodiments of the present invention and FIGS. 6B and 6C show pulse signals obtained by the pulse signal generating device.

Referring now to FIG. 1A, there is shown an embodiment of the rubbing location identifying device according to the invention in which the rubbing occurs at a location as indicated by a star. An arrangement of acoustic sensors installed on a casing is comprised of a pair of acoustic sensors 3 and 4 provided at respective ends of a casing 2 (a stationary body) for sensing an acoustic signal produced when a rotating body 1 rubs on the stationary body 2, a projection 5 provided on the rotating body 1 for providing a rotational pulse signal, and a magnetic pick-up 6 disposed opposite to the projection 5. The projection 5 and the magnetic pick-up 6 cooperate to form a rotational pulse generator. The time interval between rotational pulses generated by the rotational pulse generator is adopted to correspond to the distance between the acoustic sensors.

Assume now that the rubbing takes place at the star portion through one rotation of the rotor. In this case, acoustic signals $V_{AE}1$ and $V_{AE}2$ shown in FIG. 1C are produced in synchronism with a rotational pulse signal P shown in FIG. 1B. As shown, those acoustic signals $V_{AE}1$ and $V_{AE}2$ have each a peak at a single location. Those signals $V_{AE}1$ and $V_{AE}2$ thus sensed are inputted into a signal processing circuit shown in FIG. 2.

When the peaks are observed in the acoustic signals $V_{AE}1$ and $V_{AE}2$, a time difference measuring device 7 measures a time difference between the peaks as a travelling time difference $\Delta t_i$ of the acoustic signal arriving at the respective acoustic sensors 3 and 4. Then, the arrival time difference $\Delta t_i$ is converted into the rubbing location $X_i$ by using the equation (1), through a divider 8.

In the next step, the pulse interval of the rotational pulse signal P is divided with phase angle segments. Under this condition, since the pulse interval corresponds to the distance between the acoustic sensors, the phase angle $\theta_i$ corresponding to the rubbing location $X_i$ may be obtained by an operation unit 9 in accordance with the following equation $$\theta_i = 180° + (X_i/L \times 360°) \quad (2)$$

where L is the distance between the acoustic sensors. The signal of the phase angle $\theta_i$ is inputted into a memory operation section 10 for forming a rubbing location identifying signal $\overline{Z}$. The memory operation section 10 is provided with a memory having a memory capacity, i.e., a number of storage locations, corresponding to the resolution of the axial length. For example, when the axial length is divided into 360 segments, the memory capacity is $\overline{Z}(1)$ to $\overline{Z}(360)$ corresponding to 360 words. When receiving the signal of the phase angle $\theta_i$, the contents of $\overline{Z}(\theta)$ corresponding to the $\theta_i$ is added by +1. In other words, every time the peak is observed in the acoustic signal and the $\theta_1$ signal is produced, the following relation holds $$\overline{Z}(\theta_i) = \overline{Z}(\theta_i) + K \quad (3)$$

where event K=1. This is an example of a simple addition.

Let us consider a case where the time average such as an exponential average is used for the value $\overline{Z}(\theta)$. In this case, the contents of the storage location $\overline{Z}(\theta_i)$ corresponding to the phase angle $\theta_i$ is given $$\overline{Z}(\theta_i) = \frac{K - \overline{Z}(\theta_i)}{2^N} + \overline{Z}(\theta_i)$$

where N: time constant, and K=1. The contents of the other storage locations of $\overline{Z}(\theta)$ are expressed by $$\overline{Z}(\theta) = \frac{K - \overline{Z}(\theta)}{2^N} + \overline{Z}(\theta)$$

where $\theta \neq \theta_i$ and K=0. Generally, the contents of each storage location is given by $$\overline{Z}(\theta) = \frac{K - \overline{Z}(\theta)}{2^N} + \overline{Z}(\theta) \quad (4)$$

When an event is present, K=1 at $\theta = \theta_i$, while an event is absent, K=0 at $\theta \neq \theta_i$. In this way, the contents of the storage locations for the rubbing location identifying signal are defined.

Then, when the contents of the storage locations Z(1) to Z(360) are passed through the D/A converter 11, the rubbing location identifying signal $\overline{Z}(t)$ in the form of an analog signal is displayed as frequency histogram on a monitoring oscilloscope.

A statistical processing method to form the rubbing location identifying signal $\overline{Z}$ in a manner that the contents of the operation memory is calculated in synchronism with the rotational pulse, will be described in detail referring to the flow-chart shown in FIG. 3.

Figure 3:
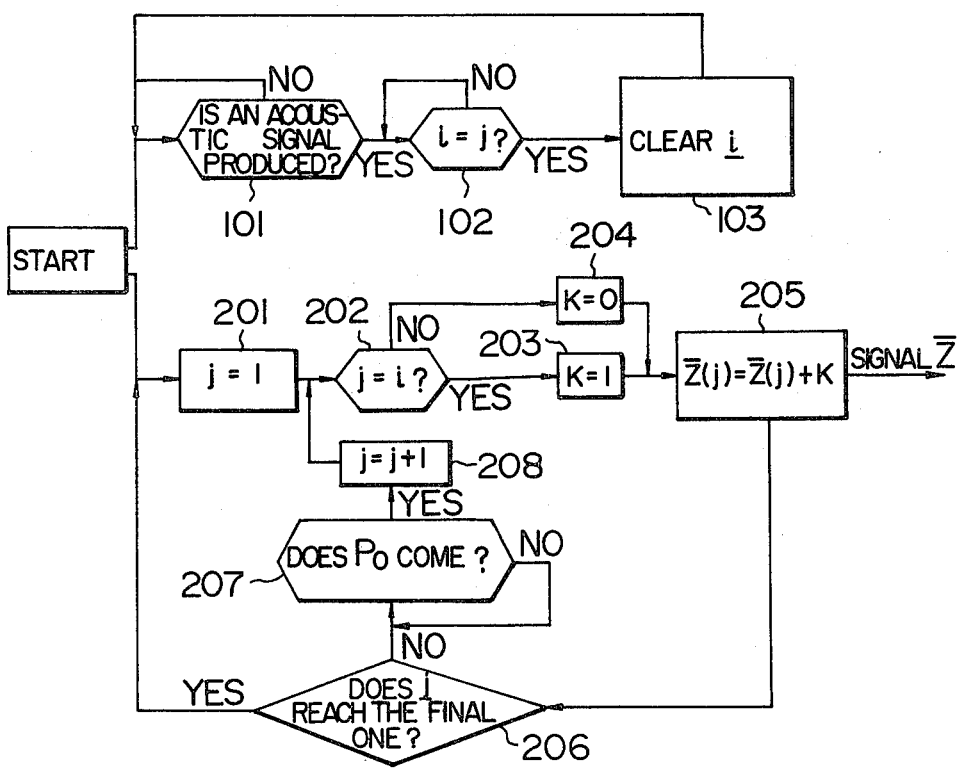
FIG. 3 shows a flow chart illustrating a signal process in the identifying device of the embodiment of the present invention.

In FIG. 3, i designates a number representing the acoustic sound originating location (rubbing position) and j represents an address number of the storage location in the operation memory.

The processing procedure of a flow-chart shown in FIG. 3 is generally classified into two loops.

A first loop checks to see if the acoustic sound is produced or not. At numeral 101, when the acoustic sound is produced, the rubbing location $X_i$ is calculated by using the equation (1), and the value $X_i$ is converted into the angle $\theta_i$ to obtain a corresponding angular number i.

A second loop of the processing procedure performs updating of the operation memory in synchronism with the rotational pulse signal P and D/A converting. At this stage, there are used the rotational pulse signal P and a signal $P_o$ which has a frequency higher than that of the rotational pulse signal P by the number of the storage locations. The signal Po is used for timing the updating of the operation memory address by address. For example, when the rotating speed is 100 rps and the number of the storage locations of the memory is 120, the frequency of the signal P is 100 Hz and that of the signal Po is as high as 12,000 Hz (100×120). In the second loop, upon arrival of the rotational pulse signal P, the address number j of the operation memory is set to the head address j=1 (reference numeral 201). The address number j is progressively updated as j=1, 2, 3, ... at the timings of the pulses of the high frequency signal Po (207).

The signal process under this initial condition will further be described in detail. At a proper time, it is checked to see whether or not the address number j is coincident with the angular number i providing the acoustic generation (202). As a result of the check, when those numbers are coincident with each other, the acoustic sound generating location $\underline{i}$ is coincident with the address number $\underline{j}$ of which the memory contents are to be subjected to the addition. In this case, the event accordingly is present and K=1 (203). When those are not coincident, no acoustic sound is produced at the location of this angle, so that the event is absent and K=0 (204). After the event K-value is defined in this way, the equation (3) or (4) is operated (205). The result of the calculation (205) produces the rubbing location identifying signal $\overline{Z}$. The next step is to check as to whether the address number $\underline{j}$ for the memory operation is the final one or not (206). If it is not the final one, the address number $\underline{j}$ is updated by one (208) after the high frequency pulse Po comes (207). The succeeding step checks again as to whether or not the angular number $\underline{i}$ representing the acoustic sound generating location is coincident with the address number $\underline{j}$ of the operation memory (202). When the address number $\underline{j}$ reaches the final one, the process flow returns to the head of the second loop (201).

When the angular number $\underline{i}$ of the angle representing the acoustic sound generating location is coincident with the address number $\underline{j}$ of the operation memory, the updating calculation of the J-th memory has been done. Therefore, the address number $\underline{i}$ is cleared (103) and the process flow returns to the head of the first loop to check again if the acoustic sound is produced or not. Through repetition of the above-mentioned operations, a frequency of determination of the location where the acoustic signal is originated is distinguishedly observed.

Finally, the histogram of the rubbing location identifying signal $\overline{Z}$ as shown in FIG. 1D is obtained.

In the histogram, the abscissa represents the axial distance measured from a reference point of the rotating body while the ordinate represents a frequency of determinations of each location where the acoustic signal is produced.

When a peak is observed at a specific location in the histogram, the rubbing phenomenon takes place there. When no rubbing phenomenon takes place in the rotating machine, the histogram is flat without the peak.

The rubbing location identifying signal $\overline{Z}$ thus obtained is displayed as shown in FIG. 1D and the phase $\theta_1$ as measured with respect to the rotational pulses indicates the result of the rubbing location identification.

FIG. 4 illustrates acoustic signals $V_{AE}1$ and $V_{AE}2$ and the location identifying signal $\overline{Z}$, where the rubbing takes place at two locations. It is assumed that the rubbing occurs at two locations in one revolution as indicated by stars. In this case, acoustic signals $V_{AE}1$ and $V_{AE}2$ shown in FIG. 4C are obtained in synchronism with the rotational pulse signal P shown in FIG. 4B. As seen, those acoustic signals $V_{AE}1$ and $V_{AE}2$ each have two peaks. The acoustic signals $V_{AE}1$ and $V_{AE}2$ thus sensed are inputted into the signal process circuit shown in FIG. 2, as mentioned above and are subjected to the statistical process by the flow chart shown in FIG. 3.

The case of two rubbing locations corresponds to a case where there are two storage locations of the $\underline{i}$ in the step 101 in FIG. 3, i.e., i(1) and i(2).

Figure 2:
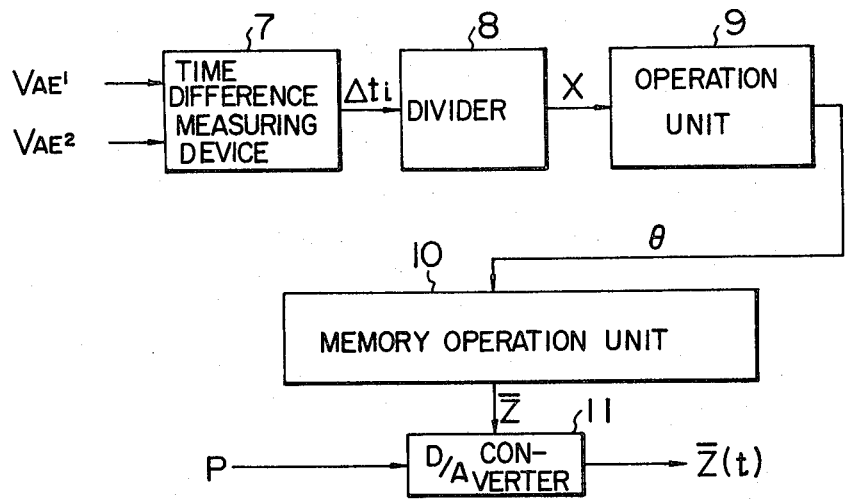
FIG. 2 shows a block diagram of signal processing section used in the rubbing location identifying device of the embodiment of the present invention.
Figure 4A:
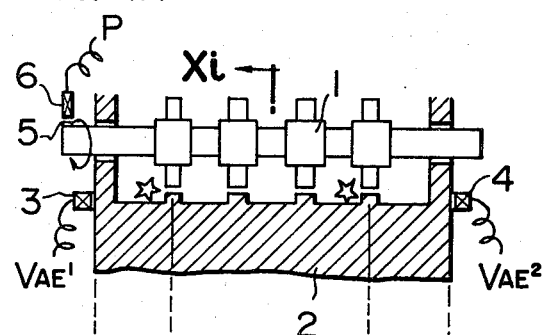
FIG. 4A shows the embodiment of the rubbing location identifying device of the invention for a rotating machine and FIGS. 4B-4D show a set of waveforms when the rubbings occur simultaneously at a plurality of locations.
Figure 4B:
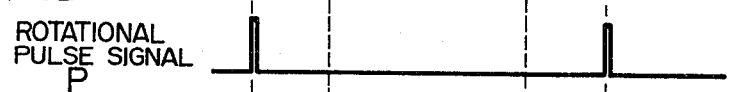
Figure 4C:
Figure 4D:
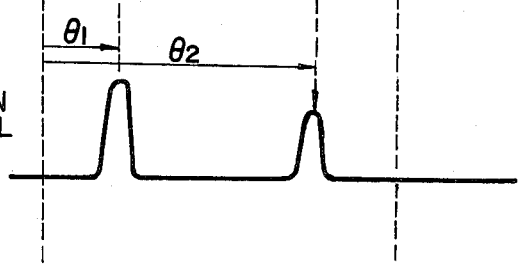

The phase angle $\theta_i$ is calculated by the signal processing circuit shown in FIG. 2 at the first rising edge of the acoustic signal $V_{AE}1$ shown in FIG. 4C, and i(1)=i$_1$ is set up in the circuit 101. Similarly, the phase angle $\theta_2$ is calculated at the second rising edge of the acoustic signal $V_{AE}2$ shown in FIG. 4C and i(2)=i$_2$ is set up in the circuit 101. Under this condition, the second loop of the processing procedure shown in FIG. 3 judges if j=i(1) or j=i(2) by the circuit 202. After the setting of K in the circuit 203 or 204, the calculation in the circuit 205 is performed similarly in the above-mentioned embodiment. Through this operation, two peaks rise as shown in FIG. 4D. As a result, the phases $\theta_1$ and $\theta_2$ of the peaks of the signal $\overline{Z}$ are the result of the rubbing location identification.

While in the above-mentioned embodiment, the pulse interval between the rotational pulse signals P is set equal to the distance between the acoustic sensors, the same effects are obtainable if it is selected to be equal to the shaft length of the rotor. In this case, the mounting positions of the acoustic sensors are outside the rubbing location identifying extent.

Let us consider a case in a rotating machine with a number of blade wheels mounted on the shaft, as shown in FIG. 5, and a blade wheel being involved in the rubbing is specified. When the length across the overall blade wheels is $l_2$ and the length of the shaft is $l_1$, if the value $l_2$ is applied to the equation (2), the pulse interval of the $\overline{Z}(\theta)$ represents the length $l_2$ across all the blade wheels.

The signal processing in all the embodiments as mentioned above is performed using the rotational pulse signal P produced at every rotation of the rotor, as a reference. The rotational pulse is sensed from the rotating body as one pulse for each rotation.

Actually, there is only a few rotating machines which working to be able to sense the rotational pulses, and the usual rotating machines have, in general, no such a function. In this case, various projections mounted on the rotating body are usually used for sensing the rotational pulses. As a matter of course, in the case where the rotating body has only one projection on the periphery of the rotating shaft, one rotational pulse is produced for each rotation. The rotating machine having a single projection on the periphery is a rare case, however. Usually, a plurality of projections are provided. For example, when six nuts 13 are mounted to a coupling 12 as shown in FIG. 6, rotational pulse signals P' with the same number as that of the nuts 13, as shown in FIG. 6B are produced from the nuts 13 through one rotation.

In this case, the rotational pulses P' can not directly be applied as the rotational pulse signals to the rubbing location identifying device. Therefore, to obtain the rotational pulse signal P as shown in FIG. 6C, the device must be designed such that a single pulse is additionally produced, after $\underline{n}$ pulses arrive, since the position of the gap sensor 14 is previously known and therefore the number $\underline{n}$ of pulses produced for one rotation is known.

As seen from the foregoing description, the present invention attains the following effects.

(i) The rubbing location identifying device of the present invention is well suited for a monitor, since the rubbing location can be found from the phase between the peak of the location identifying signal $\overline{Z}$ and the rotational pulse.

(ii) In case where the rotating body comes in contact with the stationary body at a plurality of axial locations, the rubbing positions at the plurality of locations may be identified accurately.

What we claim is:

1. A rubbing location identifying device for a rotating machine comprising: means including at least two acoustic sensors for sensing a rubbing sound produced when a rotary body comes into contact with a stationary body in a rotating machine; rotational pulse generating means for generating rotational pulses one for each rotation of the rotating body; means responsive to said acoustic sensors for determining an acoustic sound producing location in an axial direction of the rotating machine on the basis of the travelling time difference of the acoustic signals arriving at said acoustic sensors; memory means having a plurality of storage locations each corresponding to a respective incremental distance from a reference point on the rotating body and being responsive to the output of said determining means for storing a digital value during successive rotations of said body in those storage locations which correspond to any acoustic sound producing locations; and D/A converter means for D/A converting the memory content of said storage locations representative of a histogram of the number of the acoustic locations determined by said determining means, whereby an identifying signal identifying the rubbing location in the axial direction of the rotating body is obtained in synchronism with the rotational pulse signal, and thus the phase of a peak of the rubbing location identifying signal as measured with respect to the pulse interval is provided to represent an actual rubbing location.

2. A rubbing location identifying device according to claim 1, wherein the pulse interval between the rotational pulse signals is selected to correspond to the distance between said acoustic sensors.

3. A rubbing location identifying device according to claim 1, wherein said acoustic sensors are provided outside a rubbing location identifying extent.

4. A rubbing location identifying device according to claim 3, wherein the pulse interval between the rotational pulses is selected to correspond to the shaft length of the rotating body.

5. A rubbing location identifying device according to claim 1, said rotational pulse generating means includes first means for generating n pulses one for each rotation of the rotating body and second means for producing one pulse for each n pulses received from said first means.

* * * * *